US005873110A

United States Patent [19]

Toyosawa et al.

[11] Patent Number: 5,873,110

[45] Date of Patent: Feb. 16, 1999

[54] CHARACTER INFORMATION PROCESSING DEVICE EQUIPPED WITH A LAYOUT DISPLAY FUNCTION

[75] Inventors: Yoshiya Toyosawa; Hiroyasu Kurashina; Takeshi Hosokawa, all of Suwa; Kenji Watanabe, Tokyo; Takanobu Kameda, Tokyo; Chieko Aida, Tokyo; Tomoyuki Shimmura, Tokyo, all of Japan

[73] Assignees: Seiko Epson Corporation; King Jim Co., Ltd., both of Tokyo, Japan

[21] Appl. No.: 619,765

[22] PCT Filed: Dec. 4, 1995

[86] PCT No.: PCT/JP95/02469

§ 371 Date: Jul. 8, 1996

§ 102(e) Date: Jul. 8, 1996

[87] PCT Pub. No.: WO96/16813

PCT Pub. Date: Jun. 6, 1996

[30] Foreign Application Priority Data

Dec. 2, 1994 [JP] Japan .................................... 6-299598
Dec. 7, 1994 [JP] Japan .................................... 6-303358

[51] Int. Cl.[6] ........................................................ G06F 3/00

[52] U.S. Cl. ............................................ 707/518; 707/526

[58] Field of Search .................................... 395/779, 780, 395/782, 788, 789, 792, 793, 802; 345/115, 116; 400/62, 63, 65, 83; 707/517, 518, 520, 526, 527, 530, 531, 539

[56] References Cited

U.S. PATENT DOCUMENTS

| | | | |
|---|---|---|---|
| 4,451,900 | 5/1984 | Mayer et al. | 395/789 |
| 4,586,156 | 4/1986 | Kurata et al. | 395/789 |
| 4,951,233 | 8/1990 | Fujiwara et al. | 395/787 |
| 5,029,114 | 7/1991 | Makiguchi | 395/139 |
| 5,123,062 | 6/1992 | Sangu | 382/174 |
| 5,151,975 | 9/1992 | Shiraki et al. | 395/782 |
| 5,251,292 | 10/1993 | Martel, Jr. et al. | 395/801 |
| 5,444,828 | 8/1995 | Kataoka | 395/117 |
| 5,651,619 | 7/1997 | Nunokawa et al. | 400/83 |

FOREIGN PATENT DOCUMENTS

| | | |
|---|---|---|
| 2-294817 | 12/1990 | Japan . |
| 5-108630 | 4/1993 | Japan . |
| 6-198962 | 7/1994 | Japan . |
| 6202304 | 7/1994 | Japan . |
| 6-227052 | 8/1994 | Japan . |

OTHER PUBLICATIONS

Patent Abstracts of Japan, vol. 018, No. 557 (P–1817), 24 Oct. 1994 (Abstract of JP–A–06–202304)

*Primary Examiner*—Stephen S. Hong
*Attorney, Agent, or Firm*—Loeb & Loeb LLP

[57] ABSTRACT

Tape printing device 1 is provided with the second and third screen modes M1 and M2, in which the input document and its layout can be simultaneously displayed on the same screen. These modes can be switched by operating layout image simultaneous display key 23. The user can enter a document while viewing its layout image displayed on the same screen to obtain the desired layout. Thus, the present invention provides a user-friendly character information processing device in which the user can enter a document while viewing the layout image on screen to obtain the desired layout.

8 Claims, 11 Drawing Sheets

MODE M1

MODE M2

| TYPE | INPUT DISPLAY AREA | IMAGE DISPLAY AREA | PRINT LENGTH DISPLAY | TAPE WIDTH DISPLAY |
|---|---|---|---|---|
| G0 | LINES 1 - 4 | NONE | NO | NO |
| G1 | LINES 2 - 4 | LINE 1 | YES | NO |
| G2 | LINES 3 - 4 | LINES 1 - 2 | YES | YES |

FIG._5

| TAPE WIDTH | G1 | | | G2 | | |
|---|---|---|---|---|---|---|
| | TOP MARGIN | TAPE WIDTH DISPLAY | BOTTOM MARGIN | TOP MARGIN | TAPE WIDTH DISPLAY | BOTTOM MARGIN |
| 6 mm | 5 DOTS | 6 | 5 | 10 | 12 | 10 |
| 9 | 4 | 8 | 4 | 8 | 16 | 8 |
| 12 | 2 | 12 | 2 | 4 | 24 | 4 |
| 18 | 0 | 16 | 0 | 0 | 32 | 0 |
| 24 | 0 | 16 | 0 | 0 | 32 | 0 |

FIG._6

MODE M1

MODE M2

CHARACTER INFORMATION PROCESSING DEVICE EQUIPPED WITH A LAYOUT DISPLAY FUNCTION

FIELD OF THE INVENTION

This invention relates to a character information processing device that is provided with a layout display function for displaying an input document in the image to be actually printed, and that prints out the input document or performs imprinting.

DESCRIPTION OF THE RELATED ART

Generally speaking, Japanese or English wordprocessors are provided with various functions for simplifying document entry and editing tasks. One of these functions is a layout function. Switching the screen from a document display mode to a layout display mode displays the document being worked on in the layout that will be actually printed, in a graphic display format such as dot columns and lines. By viewing this layout display, the user can evaluate the actual print-out image on the screen.

This type of layout display function was disclosed in Japanese Patent Application No. H5-108630, for example. The layout display function disclosed in this publication allows correction and editing of the document data on the screen while the screen is in the layout display mode.

Recently, small printing devices, referred to as label printers or label wordprocessor, have come into use. This type of printing device prints information onto a tape-shaped printing medium possessing an adhesive bottom surface, and is usually provided with a function to cut the printed medium to the desired length after the printing is completed. The piece of printing medium that has been cut to the desired length can then be pasted as a label in a desired location.

As is the case with ordinary wordprocessors, this type of printing device is also provided with a display function for displaying input document data. Therefore, it would be convenient if the actual print-out on a tape-shaped printing medium with a predetermined width can be determined in advance. Given such a consideration, some printing devices have been proposed that are provided with a layout function, and in which pressing a layout key switches the screen from a document input mode to a layout display mode, as in ordinary wordprocessors.

A layout display function is a convenient function which enables the user to verify information such as the position of the print content of the label being created, by displaying such information on the screen without actually printing the input document on an expensive tape-shaped printing medium. This layout display function is intended to be used after the entry of the document to be printed is completed. However, the user may wish to verify the layout even during the document input. For example, when entering a document consisting of three lines, the user may wish to verify whether or not the first two lines entered are acceptable. In such a case, a conventional layout display function requires that the screen be switched from the input mode to the layout display mode. When the layout display shows that the layout of the entered document is different from the intended layout, the user must first switch back to the input mode, adjust attributes such as character spacing, character size, and tape margin, and then again switch back to the layout mode to verify the updated layout.

As explained above, when using a conventional layout display function, it may be necessary to repeatedly switch the screen between the input mode and the layout mode until the desired layout is obtained. Such operations are cumbersome and should be eliminated.

A function that allows correction of input documents in the layout display mode has been proposed, as mentioned above. However, generally speaking, the input characters in the screen are more difficult to view in a layout display mode than in an input mode, and the operations for correcting/modifying those characters are cumbersome.

Such a problem has arisen in tape printing devices, as well as in character information processing devices that perform printing or imprinting and that possess a high degree of freedom in attributes such as character spacing, character size, and tape margin. For example, the above-mentioned problem has occurred in stamping devices that use a UV-hardening resin whose unhardened areas are removed using a rinsing solution, as the stamping surface, and that expose said stamping surface to light rays patterned according to the input character string.

In such stamping devices, the action of exposing the stamping surface to light rays patterned according to the input document is referred to as imprinting. In this Specification, the word “printing” is used to include such imprinting in some cases.

The object of this invention is to propose a user-friendly character information processing device equipped with a layout display function, that allows the user to enter documents easily in order to obtain the desired layout (printed image).

SUMMARY OF THE INVENTION

To solve the above-mentioned problems, the character information processing device of the invention is provided with a key input means for entering document data and a display means for displaying the document data; and is configured to comprise a layout data generation means for generating the data required for forming the layout image of the document to be displayed by the display means, a layout image generation means for expanding said generated layout data into layout image data which can be displayed by said display means, and a display control means for controlling said display means in a simultaneous layout image display mode in which said display document and said layout image corresponding to said display document is simultaneously displayed on the display screen of said display means.

Here, it would be preferable to configure the device such that it is possible to change the ratio between the display areas used for said display document and the display area used for said layout image during simultaneous display.

Furthermore, if a display screen that can display a multiple-line document is used for said display means, at least one line of display area can be allocated as the display area for said layout image during said simultaneous display.

In this case, the display area ratio within said display screen can be changed by changing the number of lines allocated to the display area of said display document and to the display area of said layout image.

It would be preferable to use a configuration in which said key input means is provided with a layout image simultaneous display key for specifying simultaneous display of the layout image, in which said display control means is provided with a counter for counting the number of times said layout image simultaneous display key has been used, and in which said display control means changes said ratio according to the counter value in said counter during said simultaneous layout display. When such a configuration is used, the operation for changing said display ratio can be simply performed by repeatedly pressing a single key.

In this case, a ring counter can be used for the counter, and the device can be set up such that only said display document will be displayed on said display means when the value in said ring counter reaches a preset value. This configuration is preferable since it simplifies the switching between document-only display and simultaneous layout image display.

A document usually consists of at least one paragraph, and said paragraph consists of at least one line, and said line consists of an actual line comprising at least one character or a blank line without any characters. It is possible to configure said layout data such that it comprise 5-layer hierarchical data that consists of the document handler for specifying a document, the document layer data containing the information on the document, the paragraph layer data containing the information on individual paragraphs comprising the document, the line layer data containing the information on individual lines comprising each paragraph, and character layer data containing the information on individual characters comprising each line.

Note that individual document data contained in said document layer data comprises at least the document size, a document data pointer for specifying the document that follows, and a paragraph handler for specifying paragraph layer data contained in said document data. Individual paragraph data contained in said paragraph layer data comprises at least paragraph position and size, a paragraph data pointer for specifying the paragraph that follows, and a line handler for specifying line layer data contained in said paragraph data. Individual line data contained in said line layer data comprises at least line position and size, a line data pointer for specifying the line that precedes or follows, and a character handler for specifying character layer data contained in said line data. Furthermore, individual character data contained in said character layer data comprises at least character position, and a character data pointer for specifying the character that precedes or follows.

In a character information processing device according to the present invention, when document data is inputted, a layout data generation means generates layout data required for displaying a layout image by a display means which presents how the document data looks if actually printed out. Based on the generated layout data, the layout image generation means generates layout image data required for displaying the layout data on an actual display screen of said display means. And, an input document and its layout image can be simultaneously displayed in the display screen of the display means, under the control of the display control means. Consequently, the user can perform document entry while viewing the layout image being displayed; in other words while verifying how the actual print-out would look.

In this way, the invention improves user-friendliness of character information processing devices by simplifying the operation of entering a document to obtain the desired layout.

BRIEF EXPLANATION OF THE DRAWINGS

FIG. 5 is a table showing screen mode types.

FIG. 6 is a table showing how the layout image will be displayed in a tape, a print medium, in the layout image display area of the display area in accordance with the preferred embodiment of the present invention.

FIG. 8(A) shows the display in the first screen mode M0; FIG. 8(B) shows the display in the second screen mode M1; FIG. 8(C) shows the display in the third screen mode M2.

DESCRIPTION OF THE PREFERRED EMBODIMENT

The embodiments of the invention are explained below with references to figures.

Overall configuration

Figure 1:
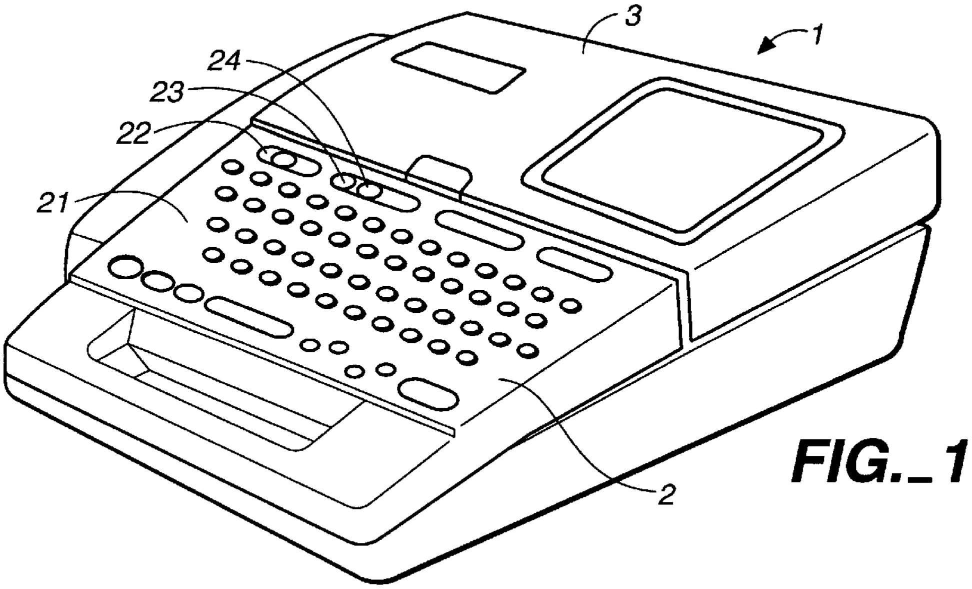
FIG. 1 is an external perspective drawing of a tape printing device to which the invention can be applied.
Figure 2:
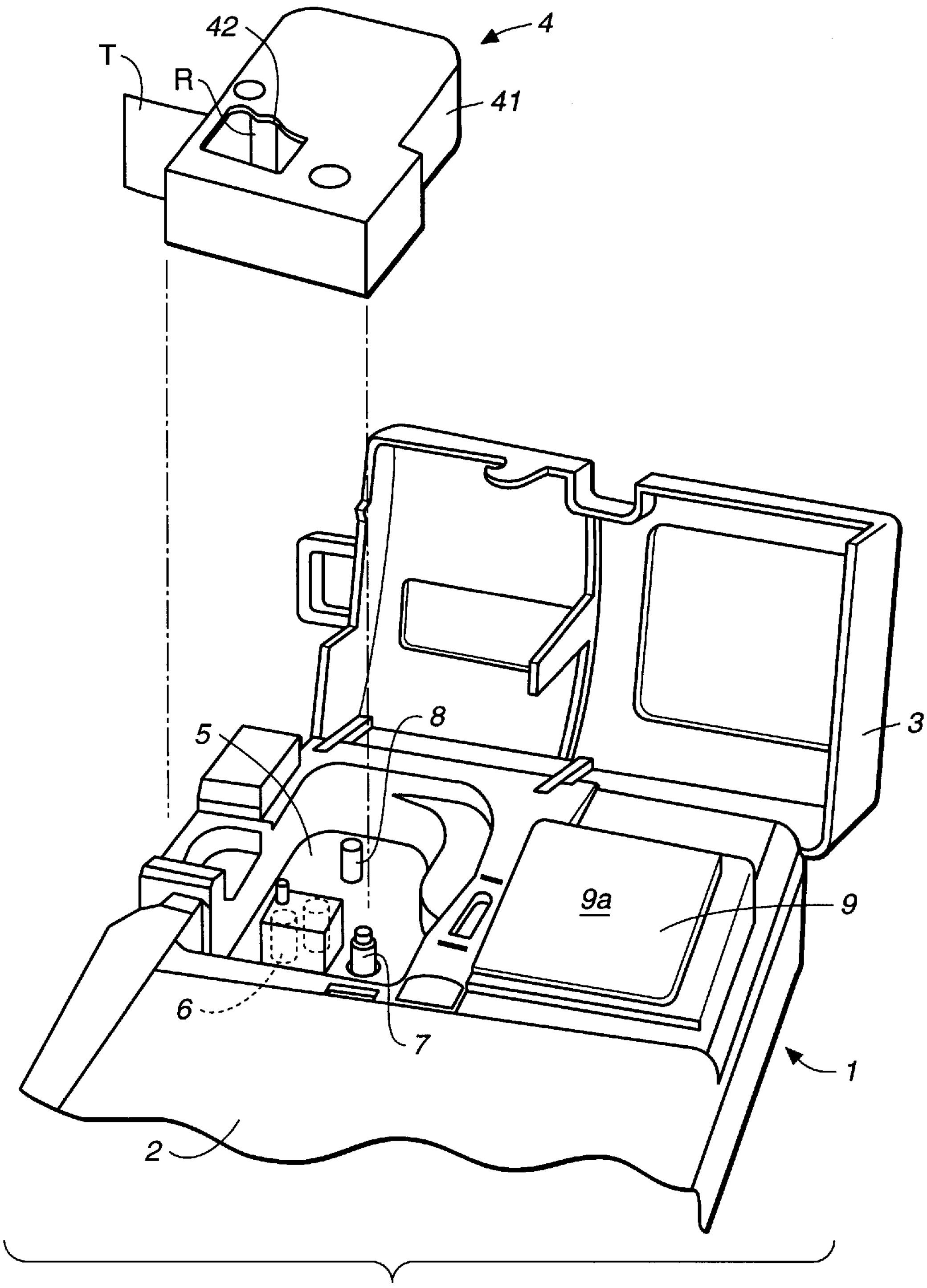
FIG. 2 is a partial perspective drawing of FIG. 1 showing the tape printing device with its lid open.

FIGS. 1 and 2 show the overall configuration of a tape printing device to which the invention has been applied. As shown in these figures, the front area of tape printing device 1 is keyboard 2, and lid 3 is installed in the rear area. Character key group 21 which includes alphabetic keys, symbol keys, etc., function key group 22 for specifying various operation modes, etc. are arranged on keyboard 2. Function key group 22 includes layout image simultaneous display key 23 used for switching to the layout image simultaneous display modes (the second and third screen modes M1 and M2 described below) in which both the document being displayed and its layout image (print image) are simultaneously displayed, and fullscreen screen layout image display key 24 used for switching the screen to the full-screen layout image display mode (the fourth screen mode M3 described below) in which only the layout image of the document being displayed is displayed.

Opening lid 3 exposes mounting area 5 for tape cartridge 4. Tape cartridge 4 which is mounted in mounting area 5 contains a tape-shaped printing medium of a certain width. The bottom of this printing medium is adhesive and covered with a peel-off backing. This printing medium (hereafter simply referred to as "tape") T and ink ribbon R are housed inside the tape cartridge. Tape T and ribbon R are transferred while overlapping each other in the position of window 42 formed in case 41. Their transfer routes are configured such that only tape T is discharged outside while ribbon R is reeled up inside.

Thermal head 6 is positioned on the side of mounting area 5, and thermal head 6 strikes the back side of ink ribbon R exposed through window 4 of tape cartridge 4 when tape cartridge 4 is mounted on mounting area 5. Therefore, by heating thermal head 6, the desired character can be printed on the surface of tape T. Drive shafts 7, 8, etc., which mechanically engage with parts of mounted tape cartridge 4 that are driven, are positioned in mounting area 5. Driving these drive shafts transfers tape T inside mounted tape cartridge 4 and ribbon R.

Liquid crystal display 9 is installed in a position adjacent to mounting area 5. Part of lid 3 that corresponds to display screen 9*a* of said liquid crystal display 9 is a clear window, such that the display screen can be viewed with lid 3 closed.

Figure 3:
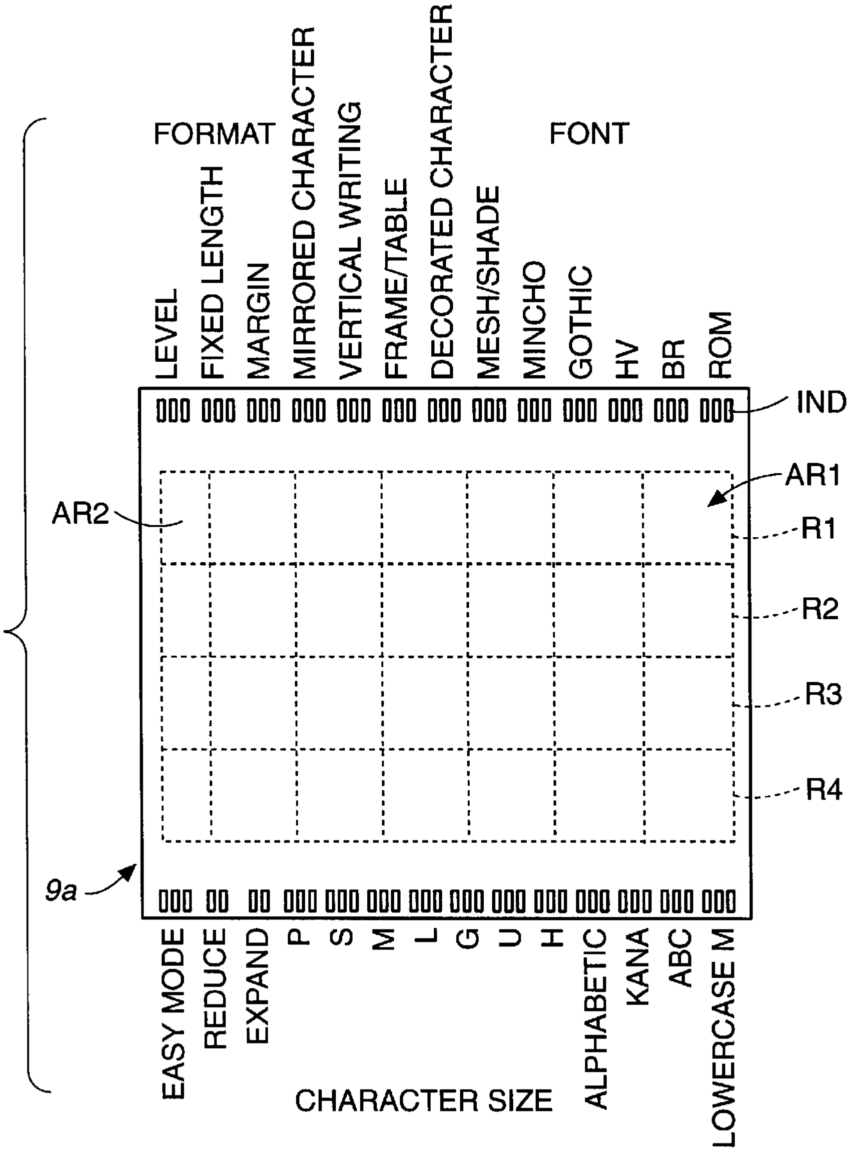
FIG. 3 is a diagram showing the display screen of a liquid crystal display of a tape printing device of FIG. 1.

FIG. 3 shows a configuration example of display screen 9*a* of liquid crystal display 9 in this working example. In this working example, a document consisting of multiple lines (for example, up to 8 lines) can be entered and displayed. Consequently, an area large enough for displaying 4 lines of 6 characters each is provided as area AR1 for displaying input documents, which is larger than the display area provided in conventional tap area AR2 for differentiating individual area AR2 for differentiating individual rows is also provided. Additionally, indicators IND for indicating ON/OFF of various attributes for the document are provided. When entering a document, areas AR1 and AR2 are used as the area for displaying the input document.

Configuration of the control system

Figure 4:
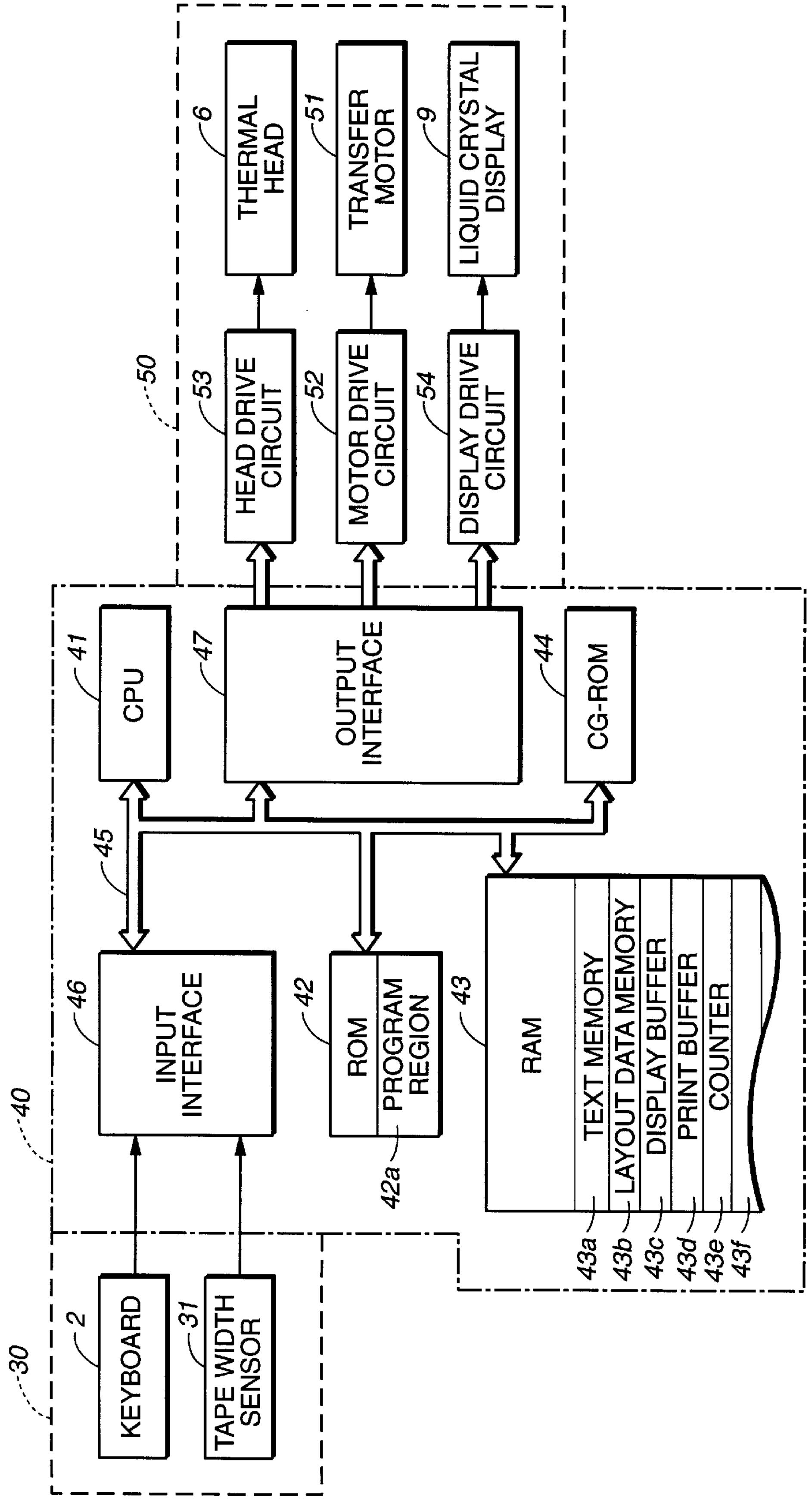
FIG. 4 is a simplified block diagram showing the control system of a tape printing device of FIG. 1.

Next, the overall configuration of the control system of tape printing device 1 of this working example will be explained with a reference to FIG. 4. The control system basically comprises input area 30, control area 40, and output area 50. Control area 40 comprises a microcomputer, for example, and is provided with CPU 41, ROM 42, RAM 43, and CG-ROM 44 in its basic circuit configuration. These circuits are connected via system bus 45 which includes the data bus and the address bus. The signal from input area 30 is input via input interface 46, and the output signal from control area 40 is output toward output area 50 via output interface 47.

ROM 42 contains program memory area 42 which stores various processing programs, and stores the control programs which control thermal head 6, liquid crystal display 9, etc., according to the code data input from keyboard 2. ROM 42 also contains the layout image simultaneous display control program which becomes activated when one of the layout image simultaneous display modes (the second and third screen modes M1 and M2) is specified, and the full-screen layout image display control program which becomes activated when the normal full-screen layout image display mode (the fourth screen mode M3) is specified. Additionally, ROM 42 contains the layout data creation control program which is used for creating the layout data required for displaying the layout of the input document by sequentially expanding the document data that corresponds to the code data input from keyboard 2. Further, contained is a layout image data creation control program for processing font data based on the created layout data to generate a layout image data which is constituted in the bit image that can be displayed on the screen of a liquid crystal display. Fixed data, such as the dictionary data for Kana-Kanji conversion, is also contained in ROM 42.

RAM 43 is used as working memory, and for storing fixed data related to user input. The contents of RAM 43 are backed up when the power is turned off. In this working example, RAM 43 contains text memory 43*a* for storing document data that corresponds to the input document, layout data memory 43*b* for storing layout data that corresponds to the document data stored in the text memory, display buffer 43*c* into which the document data to be displayed in display screen 9*a* of liquid crystal display 9 is expanded, print buffer 43*d* into which the layout image data (i.e., print data) of the display document created according to the contents of display buffer 43*c* is expanded, ring counter 43*e* for counting the number of times the instruction signal is input by the operation of layout image simultaneous display key 23, and register group 43*f* for temporarily holding the computational results of CPU 41.

CG-ROM 44 stores the font information of characters and symbols available in said tape printing device 1, and outputs the corresponding font information when code data specifying a character or symbol is provided. The font information stored in CG-ROM 44 can be either outline font or bit map font.

CPU 41 executes the control program inside ROM 42, specified by the input signal from input area 30 or the current processing stage, using RAM 43 as the work area as well as the fixed data stored in ROM 42 or RAM 43 if necessary. CPU 41 performs the control operations for displaying processing status or results on display screen 9*a* of liquid crystal display 9, or for printing such information on a tape.

Input area 30 includes keyboard 2, tape width sensor 31 for determining the width of tape T which is fed out from tape cartridge 4 mounted on mounting area 5, etc.

Output area 50 primarily comprises a print control system and a display control system. The print control system includes transfer motor 51 for transferring the tape and the ribbon, thermal head 6, etc. Thermal head 6 in this working example can simultaneously print up to 128 dots, for example. Motor 51 and thermal head 6 are driven under the control of control area 40 via motor drive circuit 52 and head drive circuit 53. The display control system includes liquid crystal display 9. This liquid crystal display 9 is also driven under the control of control area 40 via drive circuit 54, and directly displays input character strings, various types of attribute information, etc., or turns on the indicators that correspond to character strings indicating various attributes positioned around display screen 9*a* of the display.

Document input screen type

Figure 7A:
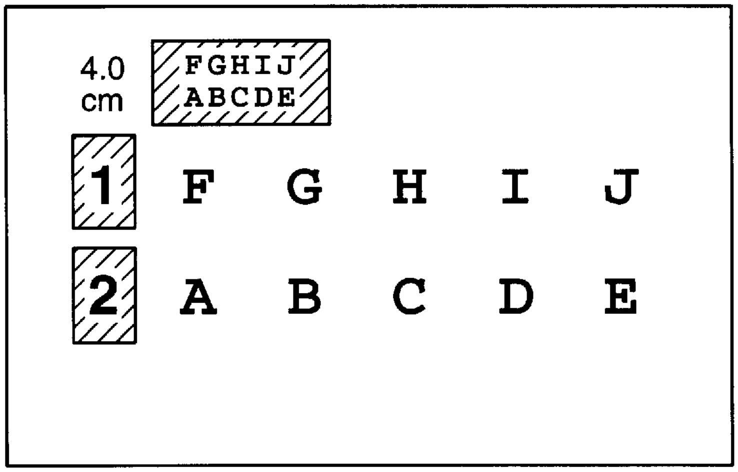
FIGS. 7A and 7B show diagrams showing the display screen when the input document consists of two lines. FIG. A shows the display in the second screen mode M1; and FIG. B shows the display in the third screen mode M2 in accordance with the perferred embodiments of the present invention.
Figure 8A:
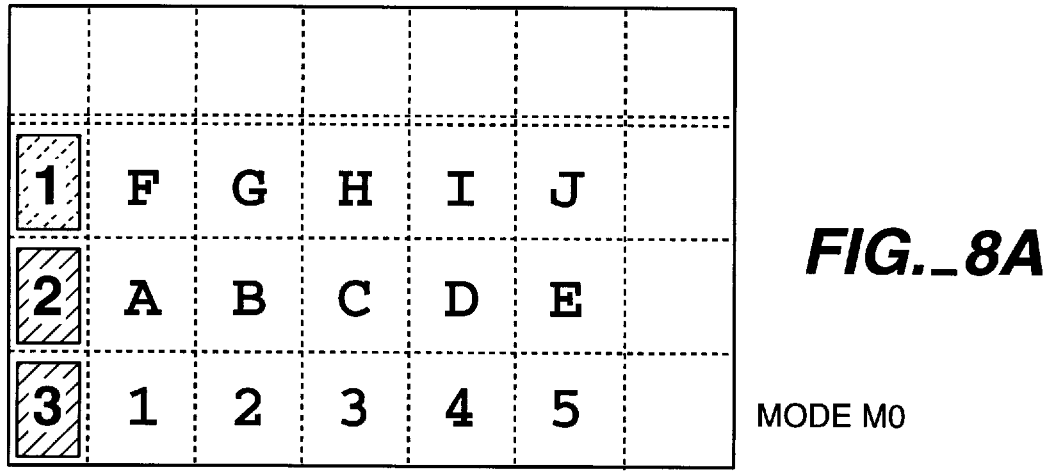
FIGS. 8A–8C show the display screen when the input document consists of three lines.

FIG. 5 shows screen modes during document input, while FIGS. 7A and B and FIGS. 8A, B and C show display examples in various modes. In this working example, three screen modes M0, M1, and M2 are provided as document input modes.

In the first mode M0, the input document is displayed in the entire display area of display screen 9*a* of liquid crystal display 9 shown in FIG. 3, i.e., in both areas AR1 and AR2. FIG. 8 A shows the display screen in this mode M0 after three lines have been input.

Figure 8B:
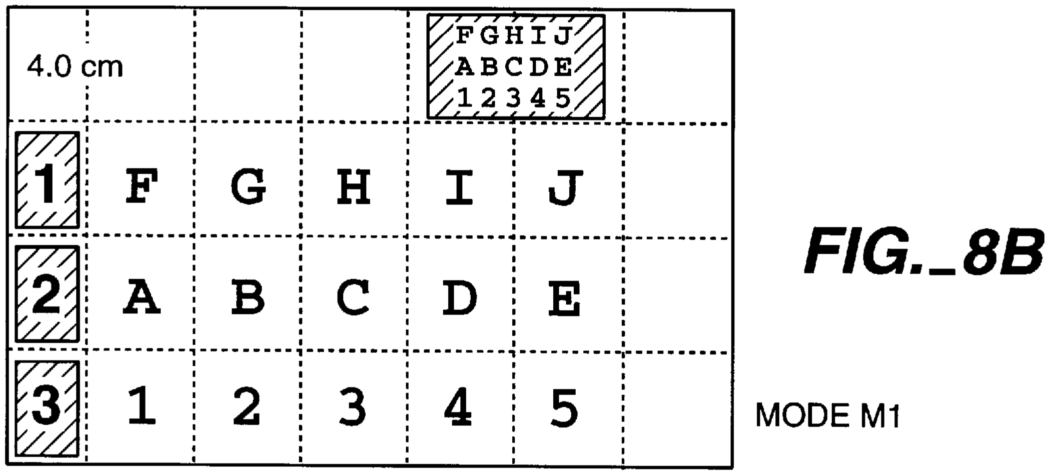

In the second mode M1, the input document is displayed in the second, third, and fourth rows of areas AR1 and AR2 of the display screen, i.e., areas R2, R3, and R4, while the layout image of the input document is displayed in the first line, i.e., area R1. In this second mode M1, row number area AR2 of area R1 in the first line also displays a value indicating the printing length. FIG. 7A shows a display screen example in this mode after two lines have been input. FIG. 8B shows a display screen example in this mode after three lines have been input.

Figure 7B:
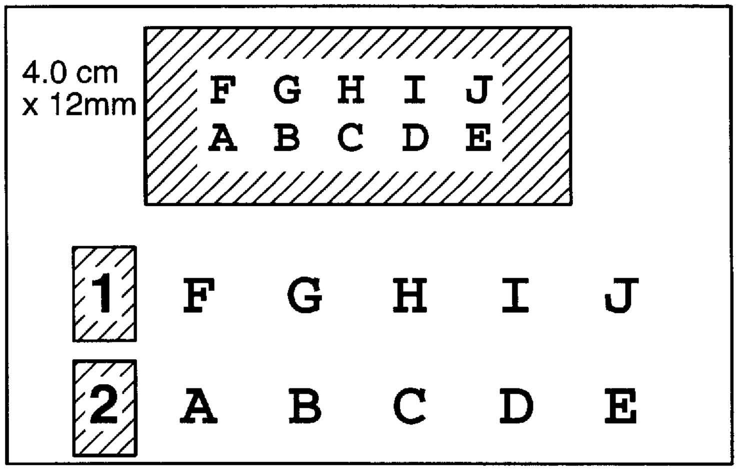
Figure 8C:
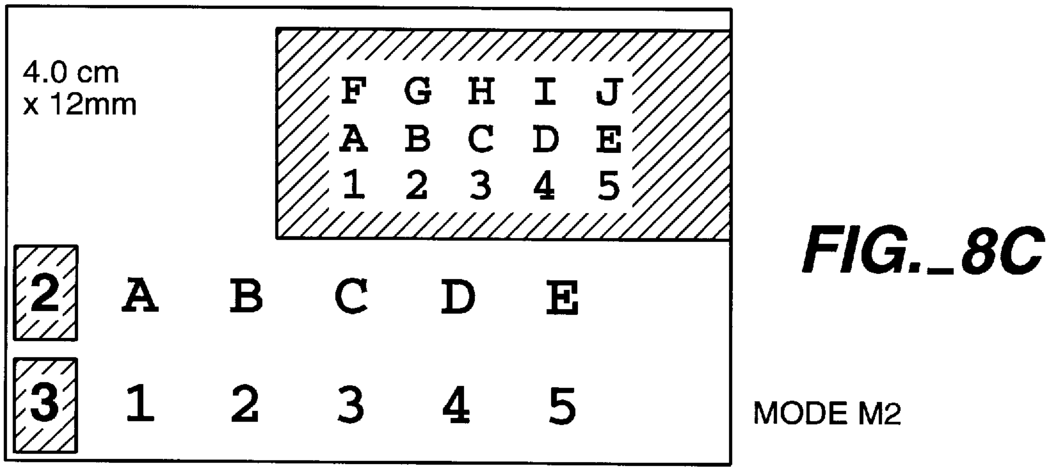

In the third mode M2, the input document is displayed in the third and fourth rows of areas AR1 and AR2 of the display screen, i.e., areas R3 and R4, while the layout image of the input document is displayed in the first and second lines, i.e., areas R1 and R2. In this third mode M2, row number area AR2 of areas R1 and R2 in the first and second lines also displays a value indicating the printing length and a character indicating the tape width. FIG. 7B shows a display screen example in this mode M2 after two lines have been input. FIG. 8C shows a display screen example in this mode M2 after three lines have been input. Here, the second mode M1, for example, is selected as the default mode.

In the explanations below, the screen area that displays the input document is called the input document display area; the screen area that displays the layout image of the input document is called the layout image display area.

In this working example, when a layout image is displayed in the layout image display area, tape width (dot count) is selected according to the width of the tape mounted in said tape printing device, as shown in FIG. 6. In the example in FIG. 6, the width-direction dot count of areas AR1 and AR2 in display screen 9*a* of the liquid crystal display is 64. In this working example, the layout image is displayed after being reduced to ⅛ of the original size in the second mode M1, and to ¼ of the original size in the third mode M2. Therefore, tape width in the layout image display area is selected as shown in FIG. 6.

Furthermore, in this working example, the character portion of the input document display area is displayed using ON dots while the background is displayed using OFF dots; the tape portion of the layout image display area is displayed using ON dots while the character portion inside is displayed using OFF dots, and the area outside the tape is displayed using OFF dots.

Note that, in this working example, the layout image can be simultaneously displayed in display screen 9*a* of the liquid crystal display in two modes M1 and M2, as explained above. Additionally, as is the case with ordinary tape printing devices, tape printing device 1 in this working example is also provided with the full-screen layout image display mode in which the layout image is displayed in the entire display screen. This mode will be referred to as the fourth mode M3.

Display modes are switched using the layout image simultaneous display key 23 and the full-screen layout image display key 24.

Layout data

The data needed for the layout image simultaneous display and full-screen layout image display is created by expanding data into layout data during character input. This layout data creation operation is explained below.

When document data is input from keyboard 2, the input data is expanded into display buffer 43*c* of RAM 43, and is sequentially displayed in display screen 9*a* of liquid crystal display 9. Synchronously with this operation, the layout data creation control program is activated, and every time one character is entered, it is expanded into layout data and sequentially stored in layout data memory 43*b* of RAM 43. At the same time, the layout image data creation control program is activated, and the created layout data is expanded into layout image data which is constituted in the bit image and is sequentially stored in print buffer 43*d* of RAM 43. Therefore, when a character is added to or deleted from the document data being displayed, the corresponding data correction is simultaneously made on the layout data inside layout data memory 43*b*. Further, the correction is also made on the layout image data within print buffer 43*d*, based on the layout data correction.

Figure 9:
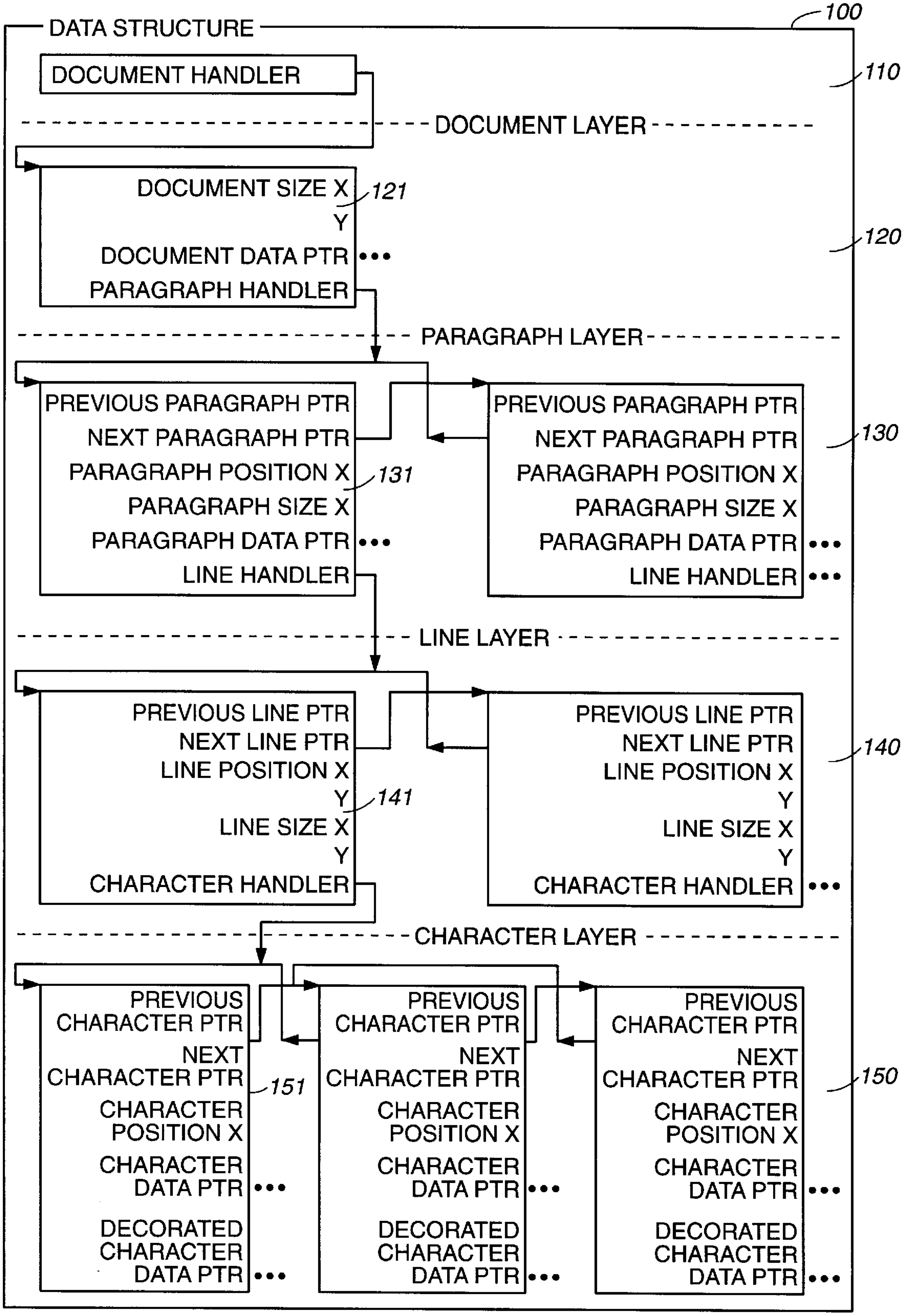
FIG. 9 is a data configuration diagram showing the hierarchical structure of the layout data in accordance with the preferred embodiment of the present invention.

Note that the layout data in this working example possesses a hierarchical structure, with 5 hierarchies as shown in FIG. 9. As can be seen from this figure, layout data 100 consists of 5 hierarchies; document handler (the first hierarchical data) 110 for specifying one document out of the group of documents entered, document layer data (the second hierarchical data) 120 containing the information on each document, paragraph layer data (the third hierarchical data) 130 containing the information on each paragraph of each document, line layer data (the fourth hierarchical data) 140 containing the information on each line of each paragraph, and character layer data (the fifth hierarchical data) 150 containing the information on each character of each line.

Figure 10:
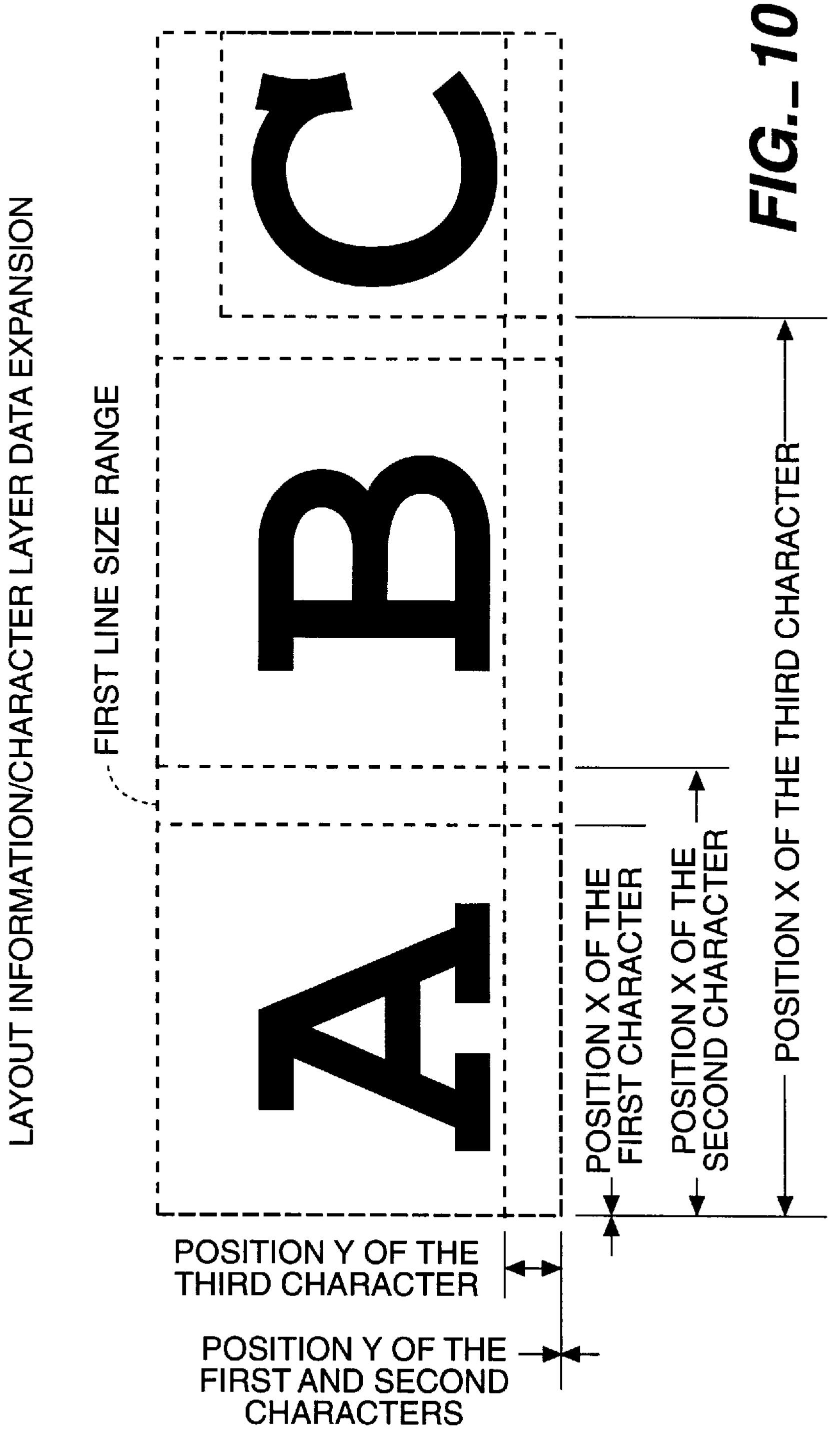
FIG. 10 is a diagram showing the document layer data of the layout data in accordance with the preferred embodiment of the present invention.

Individual document data 121 contained in document layer data 120 contains at least the document size, a document data pointer for specifying the document that precedes or follows, and a paragraph handler for specifying paragraph layer data contained in said document data. The document size information contains the height and width that specify the range in which the document will be actually printed, as shown in FIG. 10.

Figure 11:
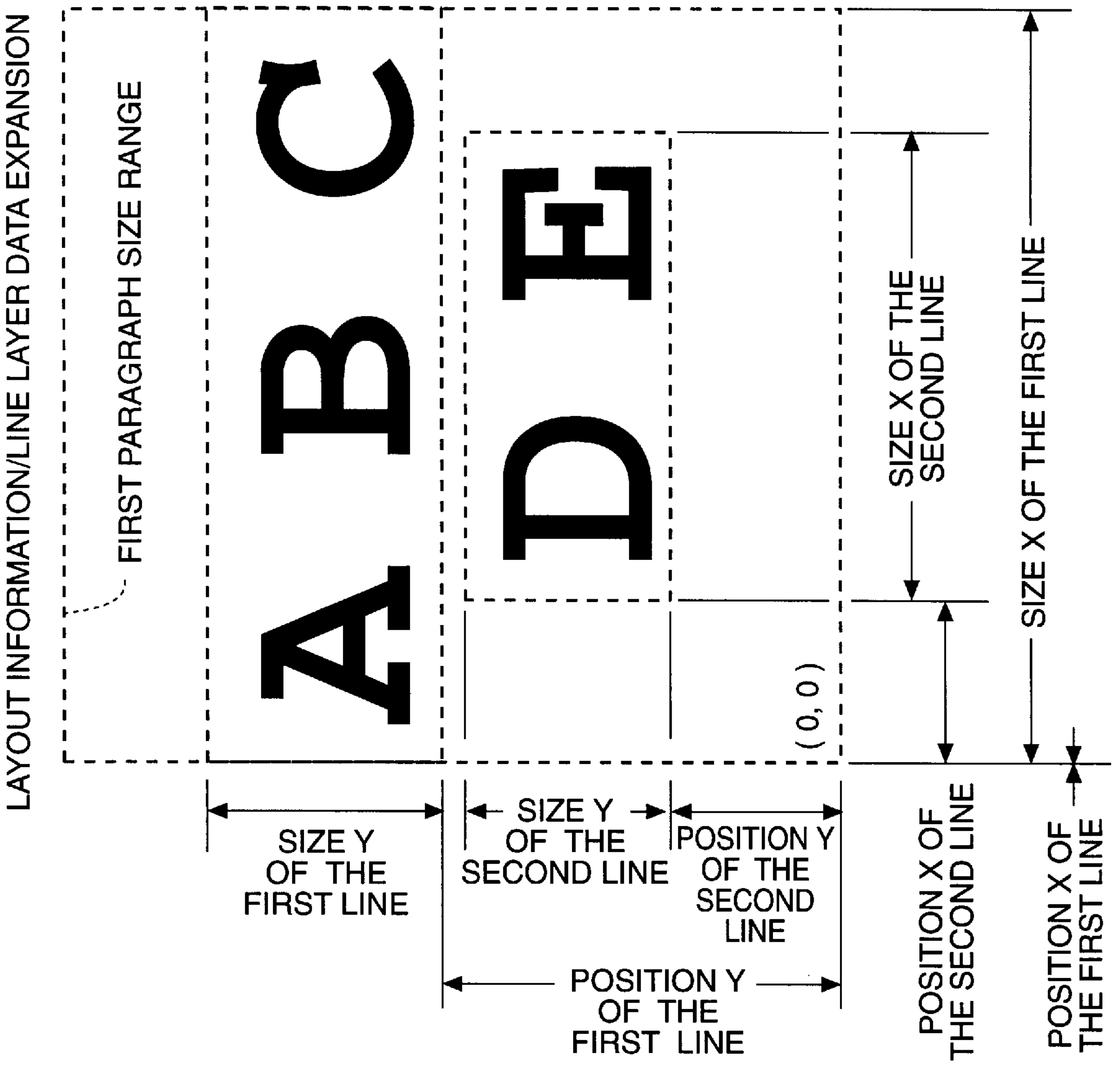
FIG. 11 is a diagram showing the paragraph layer data of the layout data in accordance with the preferred embodiment of the present invention.

Individual paragraph data 131 contained in paragraph layer data 130 also contains at least paragraph position and size, a paragraph data pointer for specifying the paragraph that precedes or follows, and a line handler for specifying line layer data contained in said paragraph data. As shown in FIG. 11, paragraph position is expressed as a distance from the start of the document, and paragraph size is expressed as paragraph length.

Figure 12:
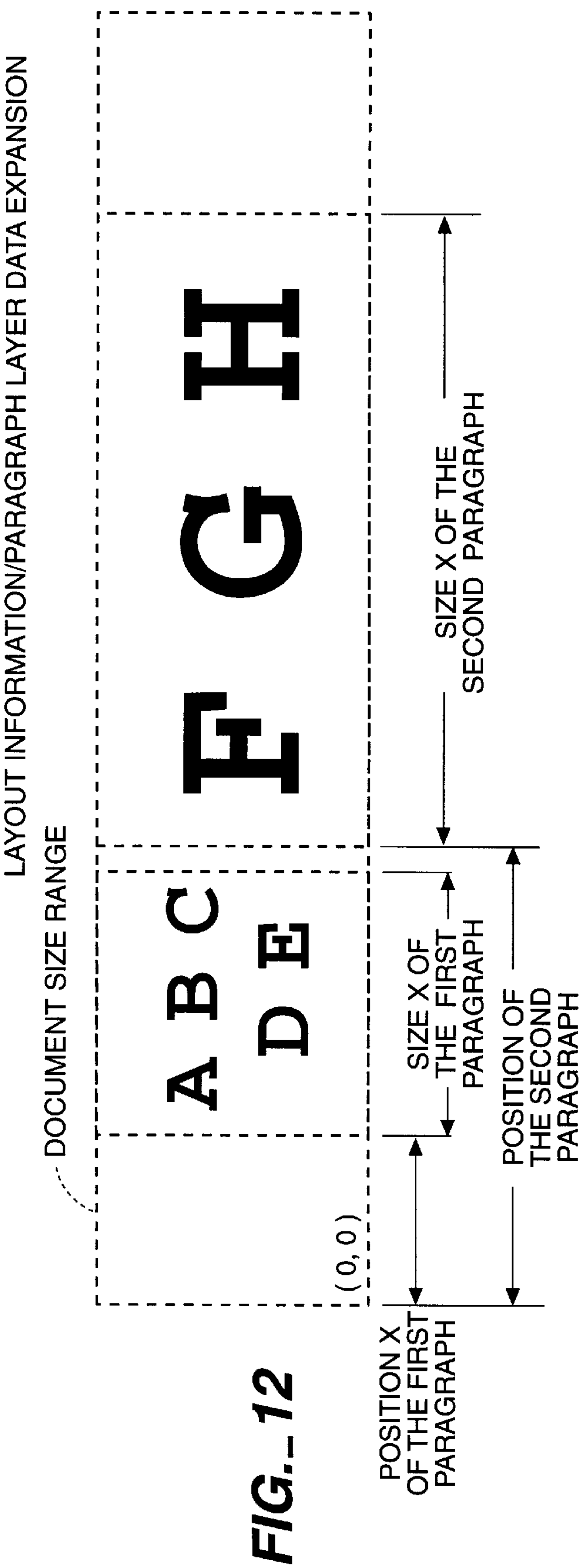
FIG. 12 is a diagram showing the line layer data of the layout data in accordance with the preferred embodiment of the present invention.

Individual line data 141 contained in line layer data 140 contains at least line position and size, a line data pointer for specifying the line that precedes or follows, and a character handler for specifying character layer data contained in said line data. As shown in FIG. 12, the line position information contains the distance between the start of the paragraph and the start of the line, and the distance from the end of the paragraph; along with line size, line length, and width.

Figure 13:
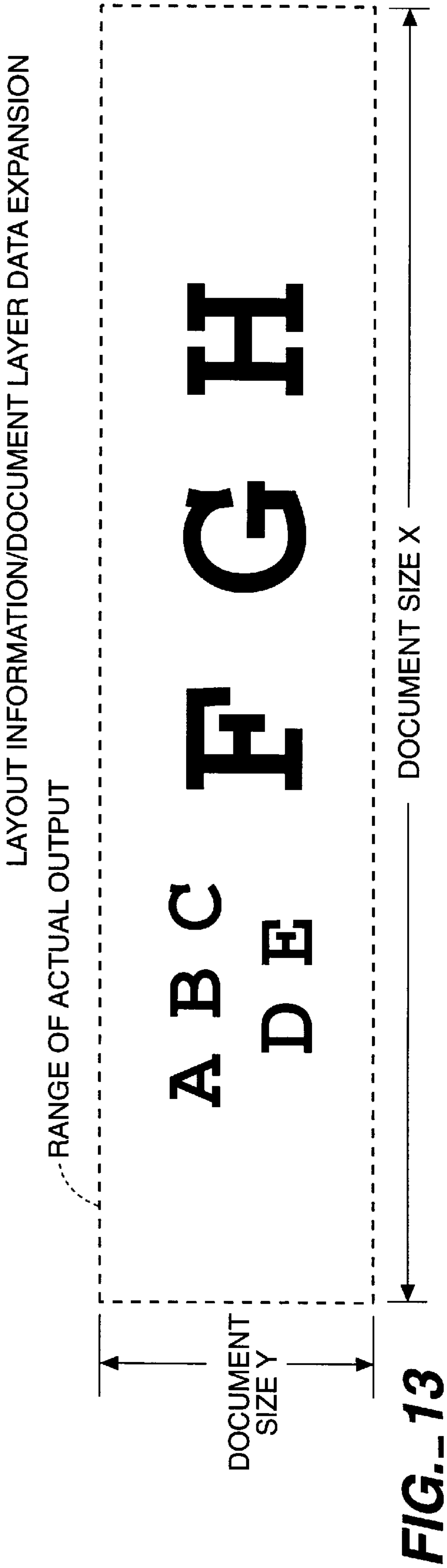
FIG. 13 is a diagram showing the character layer data of the layout data in accordance with the preferred embodiment of the present invention.

Individual character data 151 contained in character layer data 150 contains at least character position, and a character data pointer for specifying the character that precedes or follows. As shown in FIG. 13, the character position information contains the distance between the start of the line to the first character.

As explained above, in layout data 100, document data are configured in a hierarchical structure, a higher-order handler is used to specify the data in a higher or lower hierarchy, and a pointer is used to specify the data that precedes or follows within the same hierarchy. Therefore, when the document data being displayed is edited, e.g., character addition or deletion, in the display mode, all that is needed for modifying layout data 100 is addition or deletion of the pointer in each layer. As a result, creation and modification of data needed for layout simultaneous display and full-screen layout display can be performed in simple steps, because the layout image data can be created in a short period of time, whose generation is performed based on the layout data 100. In other words, data processing can be performed at high speeds.

Input document display operation

Next, the operation of tape printing device 1 of this working example will be explained, focusing on the input document display operation, with a reference to the flow chart in FIG. 14.

Figure 14:
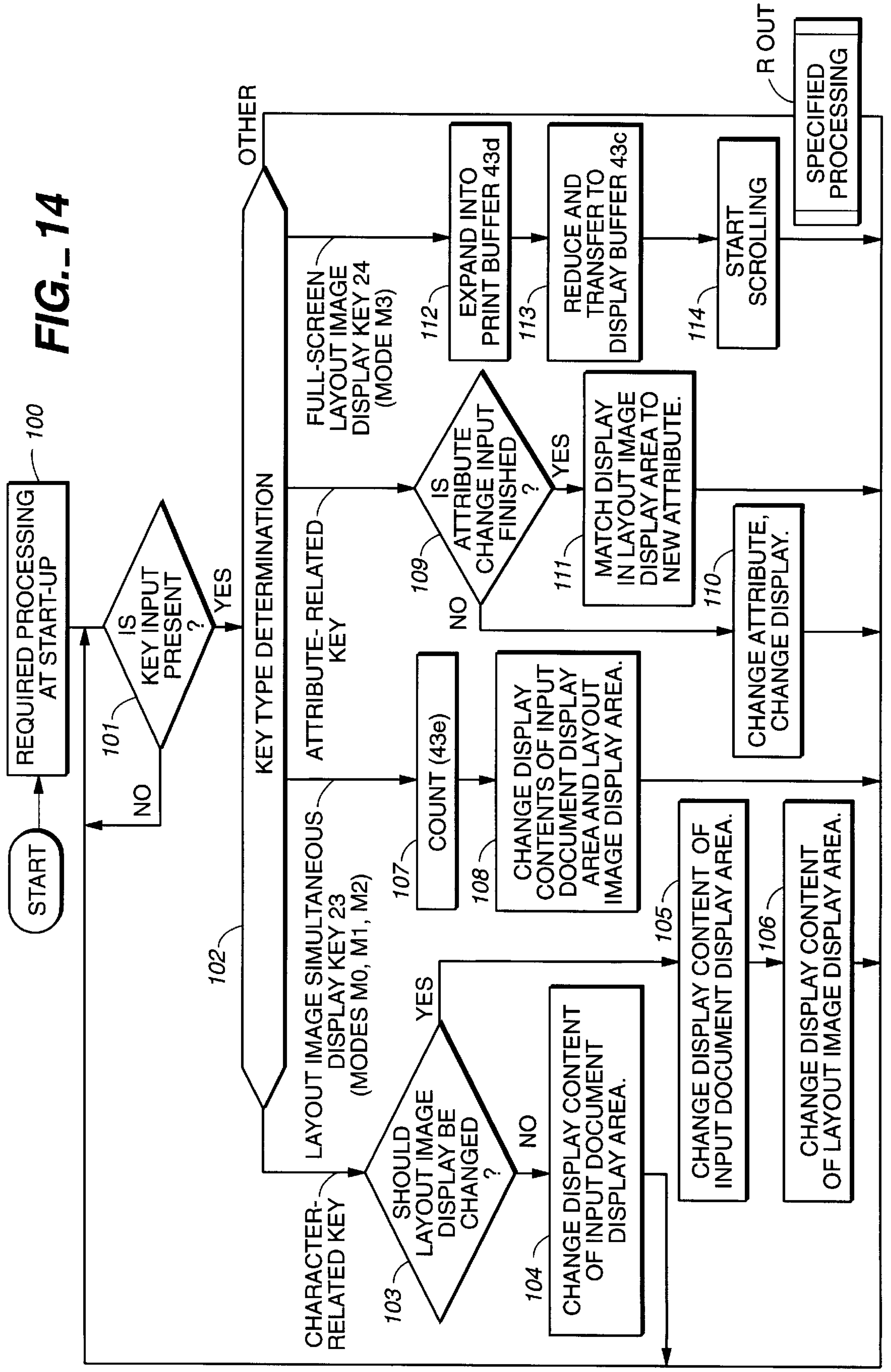
FIG. 14 shows a simplified flow chart showing the operation of a tape printing device with a focus on screen mode switching operation.

When power is turned on, CPU 41 of control area 40 activates control program 42*a* shown in FIG. 14.

Step ST100

First, various processes related to start-up are performed in step ST100. These processes include displaying of an input mode such as alphabetic, reading the width of the mounted tape from tape width sensor 31, reading the character strings saved when the power was turned off, computation of print length, subsequent display of information on the character input screen, etc. Here, the mode selection information, i.e., which of the first through fourth modes M0 through M3 had been selected before power was turned off earlier, has been backed up in the memory area inside RAM 43; and the initial display screen mode setting is performed based on this back-up information when power is turned on.

The input document data that was saved when power was turned off is stored in text memory 43*a* of RAM 43, and the information needed for displaying the layout of the document data inside the text memory is stored in layout data memory 43*b*.

If the initial display screen mode is the first screen mode M0, i.e., the normal document input mode, the document data that was being displayed when power was turned off is read from text memory 43*a,* expanded into display buffer 43*c,* and is at the same time displayed in areas R1 through R4 of lines 1 through 4 of the display screen of liquid crystal display 9.

If the initial display screen mode is the second screen mode M1, i.e., the layout image simultaneous display mode, the document layout data that was being displayed when power was turned off is read from layout data memory 43*b,* and expanded into print buffer 43*d* as layout image data. At the same time, the tape area background corresponding to the detected tape width and the character specifying tape length are expanded into the area of display buffer 43*c* that corresponds to area R1 of the first line of the screen, using ON dots. Next, the dot pattern of the layout image data that has been expanded into print buffer 43*d* is reduced to ⅛ and at the same time transferred to the area of display buffer 43*c* that corresponds to the first line area, and the dot pattern of the tape background that has been expanded into display buffer 43*c* is changed to OFF dots as necessary. Furthermore, the document data that was being displayed when power was turned off is read from text memory 43*a,* expanded into the areas of display buffer 43*c* that correspond to the second through fourth line areas of the display screen. The content of display buffer 43*c* is then displayed on display screen 9*a.* In other words, the document is displayed in areas R2 through R4 of lines 2 through 4 used as the input document display area, while the layout information including the print length is displayed in area R1 of line 1 used as the layout image display area.

In contrast, if the initial display screen mode is the third screen mode M2, i.e., the other layout image simultaneous display mode, the document layout data that was being displayed when power was turned off is read from memory 43*b,* and expanded into print buffer 43*d* as layout image data. At the same time, the tape area background corresponding to the detected tape width and the character specifying tape length are expanded into the areas of display buffer 43*c* that correspond to areas R1 and R2 of lines 1 and 2 of the screen, using ON dots. Next, the dot pattern of the layout image data that has been expanded into print buffer 43*d* is reduced to ¼ and at the same time transferred to the areas of display buffer 43*c* that correspond to the first and second line areas, and the dot pattern of the tape background that has been expanded into display buffer 43*c* is changed to OFF dots as necessary. Furthermore, the document data that was being displayed when power was turned off is read from memory 43*a,* expanded into the areas of display buffer 43*c* that correspond to the third and fourth line areas of the display screen. The content of display buffer 43*c* is then displayed on display screen 9*a.* In other words, the document is displayed in areas R3 and R4 of lines 3 and 4 used as the input document display area, while the layout information including the print length is displayed in areas R1 and R2 of lines 1 and 2 used as the layout image display area.

If tape cartridge 4 is not mounted when the printing device is in the second or third screen modes M1 or M2, i.e., layout image simultaneous display mode, this fact will be displayed in an area of the screen being used as the layout image display area.

Several methods are available for reducing the image to ¼ or ⅛. One is a sampling method that selects every fourth or eighth dots. Another is a compression method that compresses four or eight dots into one dot by computing their OR (or AND) result. This working example uses the latter method. In this case, even if only a single dot indicating background exists among the four or eight dots, the dot following the compression is treated as background. This method gives higher priority to the space between lines and characters, making the layout image display easier to see.

If the print length of the tape is too long and the layout image of the input document cannot fit inside the layout image display area, the layout image for the part of the tape located near the cursor position will be displayed. Moving the cursor right or left moves the range of character string displayed as the layout image.

Steps ST101 and 102

When initial processes for start-up are completed, the control shifts to step ST101 which waits for a new character code, control code, etc. to be entered from keyboard 2. When a key input is made, the control shifts to step ST102 which determines the input key (code) type.

If the input code is a normal code entered during document input, such as a character code and control code for confirming the input character, the control shifts to the character-related key input processing routine consisting of steps ST103 through ST106.

In contrast, if the input code is a code specifying a change in the screen mode (the first through third screen modes M0 through M2) of the display screen, i.e., if layout image simultaneous display key 23 of keyboard 2 is pressed, the control shifts to the screen mode change processing routine consisting of steps ST107 and ST108.

If the input code is a code that changes the screen mode of the display screen to the full-screen layout image display, i.e., if full-screen layout display key 24 of keyboard 2 is pressed, the control shifts to the layout image display processing routine consisting of steps ST112 through ST114.

If the input code is a code related to attributes such as character size, margin, and portrait/landscape, the control shifts to the attribute change processing routine consisting of steps ST109 through ST111.

If the input code is not any of the above codes, the control shifts to subroutine ROUT corresponding to the input code, and executes an appropriate subroutine. For example, if a stop code is input while the layout image is being scrolled, scrolling will be stopped by controlling the display buffer. If a scroll resumption code is input, scrolling will be resumed by controlling the display buffer. If a print activation code is input, for example, printing will begin. If a printing action is initiated while the display is in the layout image simultaneous display mode, i.e., the second or third screen mode M1 or M2, the expanded layout display data already exists in the print buffer, which is identical to the print data required for printing. Therefore, print data expansion can be omitted in this case.

Individual processing routines are explained below.

Character-related key input processing routine (steps ST103 through ST106)

Step ST103 determines whether or not the input code requires a change in the layout image display.

In the case of a code that requires no change in the layout image display, such as a code involving no conversion or a code that does not specify kana-kanji conversion confirmation, for example, if the code is a character code of a consonant in alphabetic input, a character code of a vowel in alphabetic input, or a character code in hiragana input, step ST104 updates the display content (input character string) in the input document display area by updating an area of display buffer 43*c* that corresponds to the input character display area, and the control returns to step ST102.

In the first screen mode M0, a confirmed character code (e.g., a numeric code) is processed as a code not requiring a change in the layout image display. For example, an unconfirmed character that has been input will be inserted and displayed in the position next to the position indicated by the cursor.

In contrast, if the code requires a change in the layout image display, such as a control code that selects and confirms no conversion, kana-kanji conversion, or a symbol, or a number or alphabetic character code requiring no conversion, step ST105 updates the display content (input document) in the input document display area by updating an area of display buffer 43*c* that corresponds to the input character display area, assuming that the screen mode is set to either the second or third mode M1 or M2. Furthermore, step ST106 updates the display content in the layout image display area by updating an area of display buffer 43*c* that corresponds to the layout image display area, according to the code. The control then returns to step ST102.

For example, if the character code of a number "1" is input, the number "1" is inserted and displayed in the position next to the position indicated by the cursor in the input document display area. If characters exist beyond the position of the cursor, their positions are changed. The display content of the layout image display area is also changed accordingly.

Screen mode change processing routine (steps ST107 and 1081

If the input code specifies a change among the first through third screen modes M0 through M2, i.e., if layout image simultaneous display key 23 is pressed, the content of ring counter 43*e* that has been expanded into RAM 43 in step ST107 is incremented. Step ST108 updates both the display content (input character string) of the input document display area and the display content of the layout image display area by changing display buffer 43*c* according to the screen mode that corresponds to the content of ring counter 43*e*. The control then returns to step ST101.

In this working example, the content of ring counter 43*e* changes cyclically in the order of 0→1→2→0 . . . , in conjunction with the operation of layout image simultaneous display key 23. Count values "0", "1", and "2" correspond to the first, second, and third screen modes M0, M1, and M2, respectively. Therefore, the screen mode can be sequentially changed by repeatedly pressing layout image simultaneous display key 23.

For example, to change from the second screen mode M1 to the third screen mode M2 when the input document contains 2 lines, the display content changes from FIG. 7A to FIG. 7B. If the input document contains 3 lines, for example, the screen mode will change from FIG. 8A to FIG. 8B, and then to FIG. 8C.

Although the characters in the layout image display area in FIG. 7(A) and FIG. 8(B) are shown as positive letters, they are actually displayed in reverse video.

Full-screen layout image display processing routine (steps ST112 through ST114)

If the input code specifies the fourth screen code M3 which displays the layout image over the entire display screen, step ST112 checks the tape width of the mounted tape cartridge 4, checks attributes such as character size for each line and print style (right-justified printing, fixed-length printing, etc.) of the input document, and expands a font (print pattern) inside CG-ROM 44 into print buffer 43*d*. Step ST113 then reduces the expanded dot pattern to ½ its original size and at the same time transfers and stores it in display buffer 43*c*. Step ST114 first displays the leading side of the pattern stored in display buffer 43*c*, and then scrolls the displayed pattern to the left. Note that the operations in steps ST113 and 114 can be performed in parallel.

In this working example, a reduction ratio of ½ is used because thermal head 6 possesses 128 dots and the width of display screen 9*a* is 64 dots. If the fourth screen mode M3, which is the full-screen layout image display mode, is activated from the second or third screen modes M1 or M2, the operation in step ST112 can be omitted since the layout data has already been expanded into print buffer 43*d*.

Attribute change processing routine (steps ST109, 110, and 111)

If the input code is a code related to attributes such as character size, margin, and portrait/landscape, ST109 first determines whether or not the code terminates an attribute change.

If the input code is not a code for terminating an attribute, step ST110 changes the content of the storage for the attribute changed by the input code and updates the change input display content of the attribute. On the other hand, if the input code does not involve an attribute change, only the change input display content is updated. For example, if the input code specifies the start of an attribute change, the content displayed on display screen 9*a* of liquid crystal display 9 is changed from the display in screen mode M0 or M2 to the display of the content to be loaded into attribute change input. If a code that specifies a character size change is input, for example, in this display state, the new character size information will be stored, and the display content for reading the attribute input will be changed accordingly.

In contrast, if the input code is a code for terminating an attribute change and returning the display to the document input screen, step ST111 switches the display content of liquid crystal display 9 to the document input screen; and if the screen mode that has been selected is the second or third mode M1 or M2, an image based on the new attribute will be displayed in the layout display area. For example, if the character size is being changed, the display character size in the layout image display will be changed by changing the size of the font (dot pattern) to be read from CG-ROM 44 and expanded into print buffer 43*d*. If the change is from landscape to portrait, the display content in the layout image display area is changed to portrait by rotating the font being read from CG-ROM 44 and expanded into print buffer 43*d*.

Effects of the working example

Tape printing device 1 of this working example is provided with display screen modes that enable simultaneous display of the input document and its layout image.

Therefore, the user can perform input operations while viewing the layout image displayed on the screen to verify whether or not the layout meets the desired requirements. In this way, it is possible to achieve a user-friendly tape printing device that simplifies the operation of entering a document to obtain the desired layout.

Furthermore, because the layout image display area on the display screen can be narrowed or widened, the user can display a layout image that corresponds to the number of input character lines. This feature also improves the user-friendliness of the tape printing device during character input.

Additionally, in this working example, screen mode can be easily changed by repeatedly pressing the layout image simultaneous display key, again improving the user-friendliness of the tape printing device.

The fact that the input document and its layout image are displayed on the same screen offers the following advantages, for example. In a tape printing device that can display a multiple-line document at once, a free area will be left on the display screen when only one or a few lines of a document have been input. In contrast, in this working example, the free area can be effectively utilized by simultaneously displaying a layout image.

Furthermore, it is possible to display a layout image in the entire display screen in this working example, preserving the same level of user-friendliness as conventional tape printing devices.

Additionally, because the layout data in this working example consists of 5 hierarchies and the relationship between data of individual hierarchies is specified using a pointer, layout data can be corrected by simply adding or deleting pointers. This structure thus simplifies the data processing operation necessary for displaying a layout image. Because the layout data is always created and maintained in this way, this data can be expanded into the print buffer for printing, thus offering a secondary benefit of accelerated print start-up.

Other embodiments

The explanations above relate to a case in which the invention is applied to tape printing devices. However, the invention can be similarly applied to other character information processing devices equipped with a display screen for displaying character input. For example, the invention can be applied to stamping devices, and in such a case, the image to be transferred to the stamping surface will be displayed on the layout image display area.

Furthermore, layout image display format need not be limited to character strings as in the above example, and can be in the form of graphics such as dot patterns or rectangular shapes. Alternatively, both characters and graphics can be used; and if the reduction rate of the characters to be displayed is large (in the second screen mode in the above example, for example), the character portion can be displayed as graphics; and if the reduction rate is small (in the third screen mode in the above example, for example), characters can be displayed as actual reduced characters. The background color is not limited to that explained in the above example, either. The tape area can be surrounded by a frame for recognition, for example.

In the above working example, two modes (the second and third screen modes) are provided as layout image simultaneous display formats in which the input document and its layout image are simultaneously displayed. Of course, it is possible to provide only one type of layout image simultaneous display mode, or three or more types of such modes.

In the above working example, unconfirmed characters are not included in the layout image display. However, it is of course possible to include unconfirmed characters in the layout image display.

Applicability in the art

As explained above, the character information processing device of the invention enables simultaneous display of an input document and its layout image on the display screen. Document input operations are thus simplified because the user can enter a document while viewing its print layout image to obtain the desired layout. As a result, a user-friendly character information processing device can be achieved.

Furthermore, the size of the layout image display area on the display screen can be changed, allowing the user to conveniently display a layout image that matches the size of the input document.

Additionally, screen mode can be changed by repeatedly pressing a single key, simplifying the operation.

Furthermore, the data necessary for the display of the layout image being created in parallel with the input document data is structured in a hierarchy, and the relationship between data of individual hierarchies is specified using a pointer. Therefore, the layout data can be corrected by simply adding or deleting pointers. Thus, the data processing necessary for layout image display is simplified.

Explanation of the symbols

1: Tape printing device
2: Keyboard
3: Lid
4: Tape cartridge
5: Tape cartridge mounting area
6: Thermal head
9: Liquid crystal display
9*a*: Display screen
23: Layout image simultaneous display key
24: Full-screen layout image display key
30: Input area
31: Tape width sensor
40: Control area
41: CPU
42: ROM
42*a*: Control program
43: RAM
44: CG-ROM
50: Output area
100: Layout image display data
110: Document handler
120: Document layer data
130: Paragraph layer data
140: Line layer data
150: Character layer data
AR1: Display area on display screen
AR2: Display area on display screen
R1 through R4: Line position

What is claimed is:

1. A character information processing device for processing document data into layout data for output by an output device, comprising:

input means for inputting the document data;

display means for displaying the document data in a first display area;

layout data generation means for generating the layout data corresponding to the document data displayed in the first display area; and simultaneous layout image display control means for controlling the display means to simultaneously display the document data in the first display area and the layout data in the second display area corresponding to the displayed document data displayed in the first display area;

wherein the display means displays the layout data in a second display area such that a ratio between the first and second display areas is changeable; and wherein a change in the magnification level of the layout data in the second display area causes a corresponding change in the size of the layout data in the second display area.

2. A character information processing device according to claim 1, wherein the ratio of the first display area to the second display area is changeable by changing a number of lines of the document data in the first display area that are displayed in the layout data of the second display area.

3. A character information processing device according to claim 2, wherein said input means comprises layout image simultaneous display input means, wherein said simultaneous layout image control means is responsive to said layout image display input means, wherein said simultaneously layout images display control means comprises a counter for counting a number of times said layout image simultaneous display input means is activated, and wherein said simultaneous layout image display control means changes the ratio in accordance with the number counted by said counter during the simultaneous layout display.

4. A character information processing device according to claim 3, wherein said counter comprises a ring counter, and wherein the document data is displayed by said display means when the number counted by said ring counter is at least a predetermined number.

5. A character information processing device according to claim 1, wherein the document data comprises at least one paragraph, and the paragraph comprises more than one line, and the line comprises one of more than one character and a blank line without any characters, and the layout data comprises a 5-layer hierarchical data comprising of a document handler for specifying a document, document layer data comprising information corresponding to the document, paragraph layer data comprising information corresponding to the paragraph comprising the document, line layer data comprising information corresponding to the lines comprising each paragraph, and character layer data comprising information corresponding to the characters comprising each line, wherein the document data contained in the document layer data comprises at least the document size, a document data pointer for specifying the document that follows, and a paragraph handler for specifying paragraph layer data contained in the document data, wherein the paragraph data contained in the paragraph layer data comprises at least paragraph position and size, a paragraph data pointer for specifying the paragraph that follows, and a line handler for specifying line layer data contained in the paragraph data, wherein the line data contained in the line layer data comprises at least line position and size, a line data pointer for specifying the line that one of precedes and follows, and a character handler for specifying character layer data contained in the line data, and wherein the character data contained in the character layer data comprises at least character position, and a character data pointer for specifying the character that one of precedes and follows.

6. A character information processing device for processing document data into image data for output by an output device comprising:

an input means for inputting the document data;

display means for displaying the document data in a first display area;

layout data generation means for generating layout data;

image means for converting the layout data to layout image data; and control means for controlling the display means to display the document data in the first display area and for simultaneously displaying the layout image data in a second display area corresponding to the document data displayed in the first display area;

wherein a ratio between the first and second display areas is changeable; and wherein a change in the magnification level of the layout data in the second display area causes a corresponding change in the size of the layout data in the second display area.

7. A method of processing and outputting document data as image data comprising the steps of:

inputting the document data on a display;

generating layout data from the document data;

converting the layout data to image data; and controlling the display to simultaneously display the image data and the document data corresponding to the displayed image data such that a change in the magnification level of the image data displayed on the display causes a corresponding change in the size of the image data displayed on the display, and further to permit a changeable ratio between the area of the document data displayed on the display, and the area of the image data displayed on the display.

8. A method of processing and outputting document data into layout data comprising the steps of:

inputting the document data;

displaying the document data on a first display area on a display, generating the layout data from the document data; and controlling the display to simultaneously display the document data on a first display area on the display and the layout data corresponding to the displayed document data on a second display area on the display such that a change in the magnification level of the layout data displayed on the display causes a corresponding change in the size of the layout data displayed on the display, and further to permit a changeable ratio between the area of the document data displayed on the display, and the area of the layout data displayed on the display.

* * * * *